United States Patent
Bozeman et al.

(10) Patent No.: US 12,223,792 B2
(45) Date of Patent: Feb. 11, 2025

(54) SYSTEMS AND METHODS FOR TILL MANAGEMENT

(71) Applicant: Tidel Engineering, L.P., Carrollton, TX (US)

(72) Inventors: Steve Bozeman, Carrollton, TX (US); Jack Lee, Carrollton, TX (US); Darren Taylor, Carrollton, TX (US); Steven Remis, Carrollton, TX (US)

(73) Assignee: Tidel Engineering, L.P., Carrollton, TX (US)

( * ) Notice: Subject to any disclaimer, the term of this patent is extended or adjusted under 35 U.S.C. 154(b) by 0 days.

(21) Appl. No.: 18/018,790

(22) PCT Filed: Jul. 27, 2021

(86) PCT No.: PCT/US2021/043291
§ 371 (c)(1),
(2) Date: Jan. 30, 2023

(87) PCT Pub. No.: WO2022/026453
PCT Pub. Date: Feb. 3, 2022

(65) Prior Publication Data
US 2023/0360461 A1    Nov. 9, 2023

Related U.S. Application Data (60) Provisional application No. 63/057,548, filed on Jul. 28, 2020.

(51) Int. Cl.
*G07D 11/34*    (2019.01)
*G07D 9/02*    (2006.01)

(52) U.S. Cl.
CPC ............ *G07D 11/34* (2019.01); *G07D 9/02* (2013.01)

(58) Field of Classification Search
CPC ................. G07D 11/34; G07D 9/02
USPC ......................................... 235/2
See application file for complete search history.

(56) References Cited

U.S. PATENT DOCUMENTS

| 8,640,945 B1 * | 2/2014 | McCormick | G07D 11/34 235/379 |
| 2003/0182217 A1 * | 9/2003 | Chiles | G07D 11/50 705/35 |

OTHER PUBLICATIONS

First Examination Report for Australian Patent Application 2021318521 dated Nov. 14, 2023 (3 pages).
Tidel Videos: "Tidel Cash Recycler video", YOUTUBE, Mar. 25, 2020.
Jun. 11, 2024—(CA) Office Action—App 3,187,338, 6 Pages.

* cited by examiner

*Primary Examiner* — Toan C Ly
(74) *Attorney, Agent, or Firm* — Polsinelli PC (57) ABSTRACT

Implementations described and claimed herein provide systems and methods for till management. In one implementation, a recycling of notes is triggered using a recycler controller. The notes are recycled using a cash recycler, and the notes corresponding to a till. A coin value of plurality of coins corresponding to the till is recorded using the recycler controller. The coin value is determined by capturing a weight of a set of coins of the plurality of coins corresponding to a designated coin denomination. The weight of the set of coins is captured using a coin scale. The till is validated based on the coin value and the recycling of the notes.

18 Claims, 5 Drawing Sheets

SYSTEMS AND METHODS FOR TILL MANAGEMENT

CROSS-REFERENCE TO RELATED APPLICATIONS

The present application claims priority to U.S. Provisional Patent Application No. 63/057,548, entitled "Systems and Methods for Till Management" and filed on Jul. 28, 2020, which is specifically incorporated by reference in its entirety herein.

TECHNICAL FIELD

Aspects of the present disclosure relate to systems and method for managing tills for a site and more particularly to a coin scale deployed in connection with a cash recycler for managing funds of a till.

BACKGROUND

Sites, such as a retail store, a dining location (e.g., a bar or a restaurant), a department store, grocers, concessions, and/or the like, balance funds to an individual coin level and an individual note level. Recyclers are commonly used by sites in connection with balancing to recycle notes and coins for creating tills or securing funds for pickup by a courier for transit to a financial institution. However, many sites are net consumers of coin, such that it is rare for coins to be transferred to the financial institution. Instead, coins are typically dispensed back for creating a till. As such, recycling coins contributes to a substantial overhead cost in recycling with only a small fraction of the value of funds corresponding to coins. Exacerbating these problems, recyclers are typically replenished with bags filled with loose coins, which are more challenging and expensive to obtain than boxes of rolled coins. It is with these observations in mind, among others, that various aspects of the present disclosure were conceived and developed.

SUMMARY

Implementations described and claimed herein address the foregoing problems by providing systems and methods for till management. In one implementation, a recycling of notes is triggered using a recycler controller. The notes are recycled using a cash recycler, and the notes corresponding to a till. A coin value of plurality of coins corresponding to the till is recorded using the recycler controller. The coin value is determined by capturing a weight of a set of coins of the plurality of coins corresponding to a designated coin denomination. The weight of the set of coins is captured using a coin scale. The till is validated based on the coin value and the recycling of the notes.

In another implementation, a recycling of notes is triggered. The notes are recycled using a cash recycler, and the notes corresponding to a till. A first prompt for weighing a first denomination of coins of a plurality of coins associated with the till is generated. A first coin value for the first denomination of coins is recorded. The first coin value is determined by capturing a first weight of the plurality of coins corresponding to the first denomination of coins, and the first weight is captured using a coin scale. A second prompt for weighing a second denomination of coins of the plurality of coins associated with the till is generated. A second coin value for the second denomination of coins is recorded. The second coin value is determined by capturing a second weight of the plurality of coins corresponding to the second denomination of coins, and the second weight is captured using the coin scale. The till is validated based on the first coin value, the second coin value, and the recycling of the notes.

In yet another implementation, a cash recycler is configured to recycle notes associated with a till. A coin scale is configured to capture a weight of a set of coins corresponding to a coin denomination for the till, and a coin value for the set of coins is determined based on the weight of the set of coins. A recycler controller is in communication with the cash recycler and the coin scale. The recycler controller is configured to validate the till based on the coin value and the notes.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for till management. Generally, a cash recycler, a coin scale, and in some cases one or more peripheral devices, such as a storage vault, a rolled coin dispenser, or a deposit vault, are in communication with a recycler controller for managing one or more tills for a site. The site may be a retail store, a dining location (e.g., a bar or a restaurant), a department store, grocers, arcade, public transportation, tolls, and/or the like. Each till may be a cash drawer, a point-of-sale station, a virtual till, and/or the like. Virtual tills are tied to an individual employee or person (e.g. a server or bartender in a dining location), rather than to a physical device, such that any transactions of the person with a virtual are logged in the virtual till instead of in connection with a physical device being operated by the person.

In one aspect, when checking in a till, coins from the till are weighed with the coin scale and notes are inserted into the cash recycler. The recycler controller is in communication with both the cash recycler and the coin scale, such that values for the coins and for the notes are recorded concurrently for accounting. The coin may be bagged and inserted into a safe for sites that are net coin recipients or returned to the till for sites that are net users of coin. The tills may be stored or returned to a register, with the till storage being either automated or dumb depending on the site. Generally, the presently disclosed technology enables the return, count, remake of tills and provides the weighing a returning or weighing and securing of coin while recycling notes. The presently disclosed technology improves the field of till management by eliminating the wasted resources associated with coin recycling for sites that are net users of coin, while optimizing balancing of funds to the individual coin level. Other advantages of the presently disclosed technology will be apparent from the present disclosure.

Figure 1:
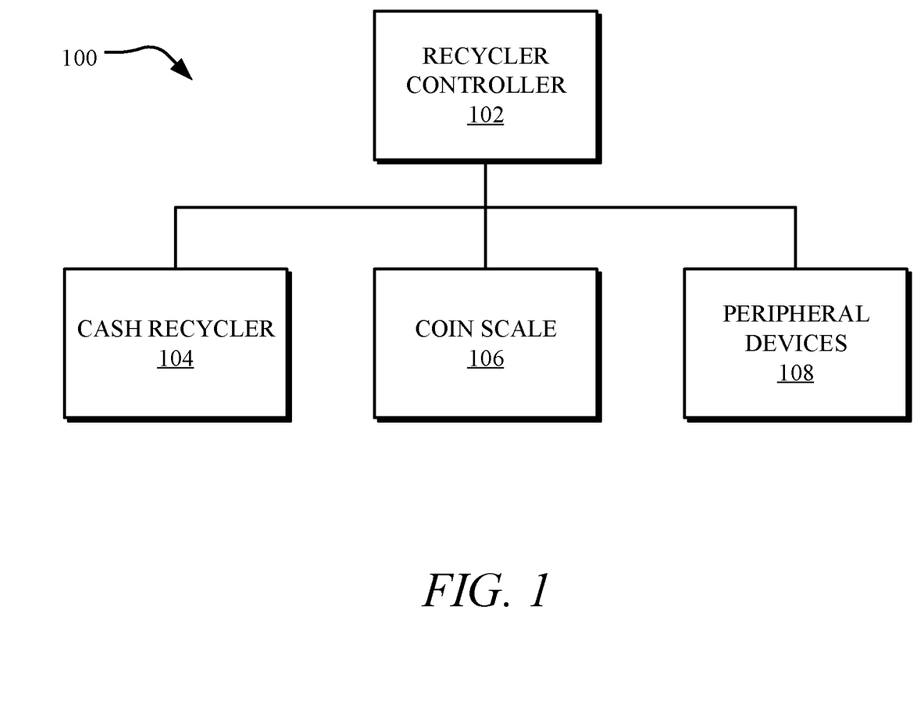
FIG. 1 illustrates an example till management system for recycling notes and weighing coins associated with a till.

To begin a detailed description of an example till management system 100 for recycling notes and weighing coins associated with a till for a site, reference is made to FIG. 1. Generally, sites that handle cash in the form of notes and/or coins, either walk their deposits to a financial institution or implement a smart safe, where a cash-in-transit operator sends a courier to retrieve a deposit on a scheduled basis. The courier takes the deposit to a counting room at the financial institution or the cash-in-transit operator location for counting, and the site is awarded a credit for the funds associated with the deposit. Many sites are net consumers of coins, such that it is rare that excess coin is taken by the courier to the financial institution. Instead, coin for such sites is usually dispensed back to site personnel in the tills or otherwise.

In one implementation, the till management system 100 includes a recycler controller 102 in communication with a cash recycler 104, a coin scale 106, and in some cases, one or more peripheral devices 108. The recycler controller 102 may be any computing device, such as those described with respect to FIG. 5, a single processing device, and/or a distributed series of computers in communication with each other. The recycler controller 102 may be integrated with another computing device or system, such as a user device described with respect to FIG. 2, the cash recycler 104, and/or the like. The recycler controller 102 may communicate with other controllers or be integrated with or directly control other controllers and components. For example, the coin scale 106 may include a separate controller that communicates with the recycler controller 102.

The coin scale 106 may be connected with or remote from the cash recycler 104. The coin scale 106 may be a weigh scale and/or any type of coin counting device, such as a coin sorter, coin bagging device, coin star machine, and/or other device that may be used to determine a value of the coins without recycling. The coin scale 106 may return the coins, store the coins for deposit, and/or direct the coins for use elsewhere. The coins may be loose, rolled, bagged, sashed, and/or the like following counting. Further, while coins are referenced throughout the application, it will be appreciated that the presently disclosed technology may be used in connection with any non-validated object of value, including but not limited to coins, notes, lottery tickets, cards, checks, and/or the like. In some cases, the recycler controller 102 may be integrated with or otherwise in communication with various devices for determining value or validating non-validated objects of value.

In one implementation, the cash recycler 104 is configured to recycle notes associated with a till, and the coin scale 106 is relatively low cost compared to a coin recycler and is configured to capture a weight of a set of coins corresponding to a coin denomination for the till, with a coin value for the set of coins being determined based on the weight of the set of coins. The peripheral devices 108 may include, without limitation, a storage vault, a rolled coin dispenser, a deposit vault, and/or the like. In one implementation, the recycler controller 102 is configured to validate the till based on the coin value and the notes and generate a transaction record for the till based on the coin value and the recycling of the notes for the till. In association with validating the till, the coins may be returned or secured in connection with recycling the notes. In some cases, the coins are kept in the till after the weight is recorded.

The cash recycler 104 receives notes for saving in recycling cassettes for dispensing back to the site, as needed, or in deposit cassettes for pickup by the courier. For example, when a clerk is beginning a shift, the cash recycling 104 may dispense a first set of notes of a first cash denomination (e.g., $20), a second set of notes of a second cash denomination (e.g., $5), a third set of notes of a third cash denomination (e.g., $1), and so on to make a till. Coins needed for the till may be kept in the till or dispensed from a coin dispenser to make the till. The value of the coins needed to make the till may be validated based on weights of coins corresponding to each coin domination that are captured using the coin scale 106. Throughout the shift, the clerk may need additional notes or coins or to deposit notes or coins above a standard level for the till. At the end of the shift, the notes from the till are inserted into the cash recycler 104 and the coins are weighed using the coin scale 106 to check-in the till. The cash recycler 104 fills the recycling cassettes to the level set by the site and any remaining cash is directed into the deposit cassettes for pickup by the courier for deposit at the financial institution.

Stated differently, the till management system 100 includes the cash recycler 104 paired with the relatively low-cost coin scale 106, with both in communication with the recycler controller 102. The till management system 100 controls the dispensing of notes from the cash recycler 104 to the standard levels of cash for the till at the beginning of a shift and takes whatever coins are present in the till and adds any coins from rolls of coins in a safe that are needed to reach the standard levels of coin for the till. If more coins or notes are needed during a shift, they may be retrieved from the safe, with a transaction for the retrieved notes or coins being recorded using the recycler controller 102. At the end of the shift, the notes are inserted into the cash recycler 104, and the coins are weighed in individual coin denominations using the coin scale 106 to determine how many coins for each coin denomination is in the till. After weighing the coins using the coin scale 106, the coins are returned to the till for use during the next shift when the till is refreshed.

In one implementation, to determine the value of coins for each denomination, the recycler controller 102 generates a series of prompts iterating through each coin denomination. Within the till, coins are separated by denomination in inserts, such that each denomination of coins is in a single insert. The coin scale 106 obtains a known weight of the insert and known weights for each denomination of coins corresponding to the till, which may be customized depending on the coin denominations desired by the site. The insert holding a first denomination of coins is placed on the coin scale 106 in response to a first prompt for the first denomination of coins. A total weight of the insert and coins contained within the insert that correspond to the first denomination of coins is captured by the coin scale 106. The weight of the first denomination of coins is determined using the known weight of the insert, and using the known weight of the first denomination of coins, a coin value for the first denomination of coins is determined. The recycler controller 102 then generates a second prompt for a second denomination of coins, and in response the process is repeated, with the recycler controller 102 iterating through all the coin denominations for the till. While a first denomination and second denomination are referenced in various example implementations, it will be appreciated that the presently disclosed technology may use any number of different denominations. Further, the presently disclosed technology may use different types of currency (e.g., the currency of different countries or other non-validated objects of value), such that the recycler controller 102 may be configured to process and quantify different types of currency and denominations to provide multi-currency and multi-denomination accounting and management.

In one implementation, the coin scale 106 or a similar weight sensor is configured to weight notes for counting. For example, a smart vault or similar deposit device may include a scale to quantify and store excess notes. As another example, the recycler controller 102 may detect a jam in the cash recycler 104. Based on the detected jam, the recycler controller 102 may prompt the user to utilize the coin scale 106 to weigh the notes through a series of prompts to weigh different denominations of notes similar to the prompts and operations described with respect to the coins. In some implementations, whenever an amount of notes, coins, or other objects of value is dispensed from a dispensing device, such as the cash recycler 104, a coin dispenser, and/or other devices, the coin scale 106 may be used to weigh the dispensed notes, coins, and/or objects of value as a second check to validate the various quantities before the denominations or amounts are qualified to be available to the user.

In addition to managing the process for making a till and checking-in a till, the recycler controller 102 manages a hierarchy of permission levels for various users associated with the site, with each permission level providing a different level of access to the cash recycler 104, the coin scale 102, and/or secured funds. For example, the hierarchy may include maintenance personnel, couriers, clerks, managers, and/or the like. Maintenance personnel may be restricted to accessing only areas of the system 100 necessary to calibrate, service, and/or repair the various components. Couriers may be granted access only to retrieve deposits. More particularly, couriers may open a vault to retrieve excess notes for deposit at the bank, withdraw the notes, and obtain a transaction receipt for the notes. The courier may also deliver coins to the site. Clerks may have lower permission levels than the manager. For example, clerks may be restricted to access needed to perform their daily duties, such as making a till at a beginning of a shift, checking-in the till at an end of the shift, obtaining a loan to make change during the shift, depositing funds during the shift if there is excess funds over the standard for the till, and/or the like. In addition to these permissions, managers may also set up new clerks, perform receipts and change orders, check in and out tills or funds for others, coordinate the couriers, perform a secondary authentication for a deposit or delivery, set up configuration items for the site (e.g., changing the standard levels for the tills), and/or the like. It will be appreciated that each of the permission levels may be customized according to user type, department, shift time, register, season, and/or other parameters.

In one implementation, access according to permission levels is controlled with a unique access identifying a particular user. The unique access may be in the form of a pin, electronic key, user biometrics (e.g., fingerprint, facial recognition, voice recognition, etc.), and other access based on information known or otherwise associated exclusively with a particular user. After a particular user submits the unique access, access to the till management system 100 is granted according to the permission levels associated with a user profile corresponding to the unique access.

Upon granting access, options within the permission levels for the particular user that are specified in the user profile may be presented. All transactions completed are stored in memory, either locally or communicated over a wired or wireless connection for remote storage, in association with the user profile. More specifically, turning to FIG. 2, which shows an example network environment 200, in one implementation, a user accesses and interacts with the recycler controller 102 using a user device 202 to access, operate, and/or control aspects of the till management system 100 and/or other information or services via a network 204.

Figure 2:
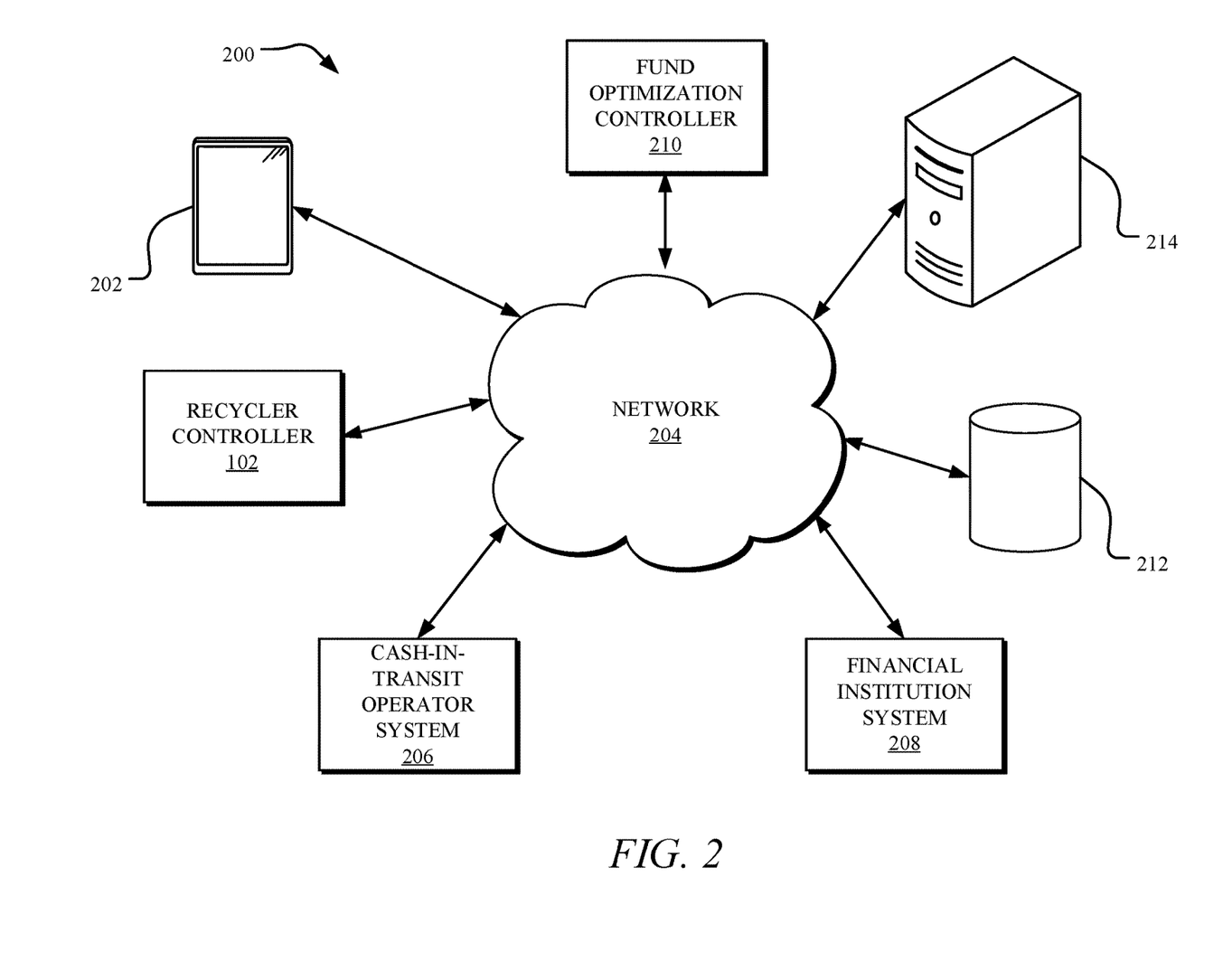
FIG. 2 illustrates an example network environment for implementing various aspects of the presently disclosed technology.

The user device 202 is generally any form of computing device capable of interacting with the network 204 and the recycler controller 102, such as a personal computer, terminal, workstation, desktop computer, portable computer, mobile device, smartphone, tablet, multimedia console, and/or the like. In some cases the user device 202 integrated into another device, such as the cash recycler 104 to provide the user with an interface (e.g., a touchscreen or other input/output devices deployed with the cash recycler 104) for direct interaction, including the prompts and presentation of options discussed herein. The recycler controller 102 may similarly be integrated with the cash recycler 104, with the coin scale 106 and any peripheral devices in communication with the recycler controller 102 via wired or wireless connection (e.g., over the network 204, Bluetooth®, etc.) The user device 202 may alternatively or additionally be a mobile device, such as a tablet, that interacts with the recycler controller 102 that is deployed in each till management system 100 for a site. It will be appreciated that multiple user devices 202 may be deployed in the network environment 100 that communicate over the network 204 to access, operate, maintain, control, or otherwise interact with one or more connected till management systems 100, as well as other information, systems, or services, such as a cash-in-transit operator system 206, a financial institution system 208, a fund optimization controller 210, and/or the like.

The network 204 is used by one or more computing or data storage devices (e.g., one or more databases 212 or other computing units described herein) for implementing the various aspects of the recycler controller 102, the cash-in-transit operator system 206, the financial institution system 210, the fund optimization controller 212, and other services, applications, or modules in the network environment 200. The user profiles, transaction reports, permission levels, access configurations, coin denominations and levels for a site, note denominations and levels for a site, deposits, known weights, user data, software, and other information utilized by the recycler controller 102 or other aspects of the network environment 200 may be stored in and accessed from the one or more databases 212. In some implementations, some data is stored locally and may be transmitted to other systems or services of the network environment 200 over the network for use or storage in the one or more databases 212.

In one implementation, the network environment 200 includes at least one server 214 hosting a website or an application that the user may visit to access the recycler controller 102 and/or other network components of the network environment 200. The server 214 may be a single server, a plurality of servers with each such server being a physical server or a virtual machine, or a collection of both physical servers and virtual machines. In another implementation, a cloud hosts one or more components of the network environment. The user devices 202, the server 214, and other resources connected to the network 204 may access one or more other servers to access to one or more websites, applications, web services interfaces, storage devices, computing devices, or the like that are used for till management, fund management, and related services. The server 214 may also host a search engine that the recycler controller 102 uses for accessing, searching for, and modifying user profiles, permission levels, underlying data, and other data, as well as for coin and note management services, as described herein.

In one example, upon granting access to the till management system 100, options within the permission levels for a particular user that are specified in the user profile are presented. All transactions completed are stored in association with the user profile in local memory or in the one or more databases 212. In one implementation, the transaction reports are transmitted to the cash-in-transit operator system 206, the financial institution system 208, and/or the fund optimization controller 210 over the network 202 or via a wired connection for reconciliation and/or deposit. In some instances, transaction reports are also provided to the user following completion of a transaction.

Based on the transaction reports, the fund optimization controller 210, which may be remote from or integrated with the recycler controller 102, generates analytics at a designated level, such as a site level, company level (i.e., across a plurality of sites), department level, user level, financial institution level, cash-in-transit operator level, courier level, and/or in connection with a designated period or designated location. Based on the analytics, aspects of till management may be predicted or optimized.

For example, the analytics may optimize fund usage to notify the site when notes or coin is predicted to be needed. More particularly, the recycler controller 102 controls access to the cash recycler 104 and may determine whether the cash recycler 104 is running low on a denomination of note. A manager, for example, may select an option to replenish the denomination of note via the user device 202, be provided with access to a compartment associated with the denomination of note, replenish the note, and receive a transaction report. The recycler controller 102 may unlock and lock the compartment accordingly. With respect to coin, the recycler controller 102 may track how much coin is left in each till at the site at the end of each business day using the coin scale 106. The analytics may involve a determination of a quantity of coin rolls delivered and a determination of a quantity of coin rolls consumed by the users in connection with replenishing tills to predict a point at when additional coin funds will be needed for the site. In some instances, an order of the additional coin funds will be automatically be transmitted over the network 202 or otherwise automatically triggered based on the prediction.

Additionally, the analytics may optimize fund usage by optimizing the standard till levels corresponding to an amount of funds in a till at the beginning of the shift or at the end of the shift. By optimizing the standard till levels, the analytics ensure that a particular till is not filled with too many funds that are not needed or too little funds, such that additional funds needed to be obtained throughout a shift. If too many funds are included in a till, the site is wasting free cash flow, since capital is tied up in a manner that is not providing any value to the site. On the other hand, if too few funds are included in the till at the beginning of a shift, customer service, efficiency, and security are wasted or threatened due to funds being carried around the site and time being taken away from business activity to replenish. Amounts of denominations may be recommended for each till, as well as providing seasonal adjustments or time of day or week adjustments for what is kept in tills, kept in the cash recycler 104, ordered, and/or deposited.

Generally, the recycler controller 102 communicates to the cash recycler 104, the coin scale 106, any peripheral devices 108, the user devices 202, and/or any other systems over the network 204. Local memory of the recycler controller 102 may store device specifications, transaction data, device history, maintenance schedules, user profiles, known weights, and/or the like for the till management system 100. The recycler controller 102 may communicate over the network 204 with the server 214 to remotely manage the systems and devices associated with the till management system 100 or the network environment 200. Overall, the cash recycler 104 recycles notes, and the coin scale 106 weighs the coins in connection with till management. Moreover, in some implementations, the cash recycler 104 may use its own escrow pocket for taking inserted notes to present back to the user for the next till rather than fully recycling the notes.

As described herein, rolls of coins are obtained from a safe until a till includes a standard level of coin denominations for the till, with those standard levels being optimized based on the analytics detailed herein. To determine when the standard level of coin denominations for the till is reached, the coin scale 106 is utilized. The insert filled with coins of a particular denomination is placed on the coin scale 106, and the coin scale 106 determines how many coins of the particular denomination are on the scale. The recycler controller 102 may instruct the user to add or subtract coin until the weight of the coin on the coin scale 106 matches the standard level of coin for the particular denomination. More particularly, the recycler controller 102 will validate the amount of coin placed on the coin scale 106 based on the weight recorded by the coin scale 106 to match the standard level. As a particular non-limiting example, the recycler controller 102 may prompt the user to place pennies on the coin scale 106 for validation. The user then places the insert containing pennies on the coin scale 106. The coin scale 106 records the weight, and based on the weight of the insert of pennies, as well as the known weights of a penny and the insert, a determination is made, that the amount of pennies is below the standard levels for pennies for the till. The recycler controller 102 prompts the user to obtain a specific number of rolls of pennies from a safe or rolled coin dispenser and place them on the coin scale 106. The coin scale 106 records the weight, and based on the weight, the recycler controller 102 validates that the specific number of rolls of pennies were added to reach the standard level for pennies for the till. The recycler controller 102 generates a transaction report that the specific user had a certain amount of pennies at the start of the transaction, and the specific number of rolls of pennies were added to reach the standard level of pennies for the till. Thus, rather than wasting significant resources and space in recycling coin for net consumers of coin, coins are weighed using the coin scale 106 for transaction reports, management, and balancing and kept in the tills. As such, the site may acquire the relatively less expensive boxes of rolled coin for replenishing coin, as opposed to bags filled with loose coin.

In one implementation, the coin scale 106 is mobile. In such cases, rather than transporting tills to the coin scale 106, the coin scale 106 is transported to each till in situ. The coin scale 106 obtains till data, including the denominations of each coin type for each till. The coin scale 106 or a point of sale (POS) system associated with a till may communicate the till data over the network 204 or directly to the recycler controller 102 for each till, and the coin scale 106, the POS system, or the recycler controller 102 may determine an amount of coins and notes needed to replenish each till. In each case, an aggregated amount of coin and notes may be dispensed based on the till data and transported to each till to distribute the amounts associated with each particular till. More particularly, the coin scale 106 may be taken to a till and the contents of the till may be weighed as described herein. Till data may be automatically captured or manually input based on the weights of the contents of the till captured by the coin scale 106. The till data is used to determine amounts for replenishing the till and communicated directly or indirectly to the recycler controller 102 for dispensing the amounts and generating associated transaction reports. Similarly, where there are multiple registers or free standing concessions, the tills or concessions may be transported to a station to manage tills using the till management system 100 or the coin scale 106 may be mobile to travel to each register or concession in situ.

Figure 3:
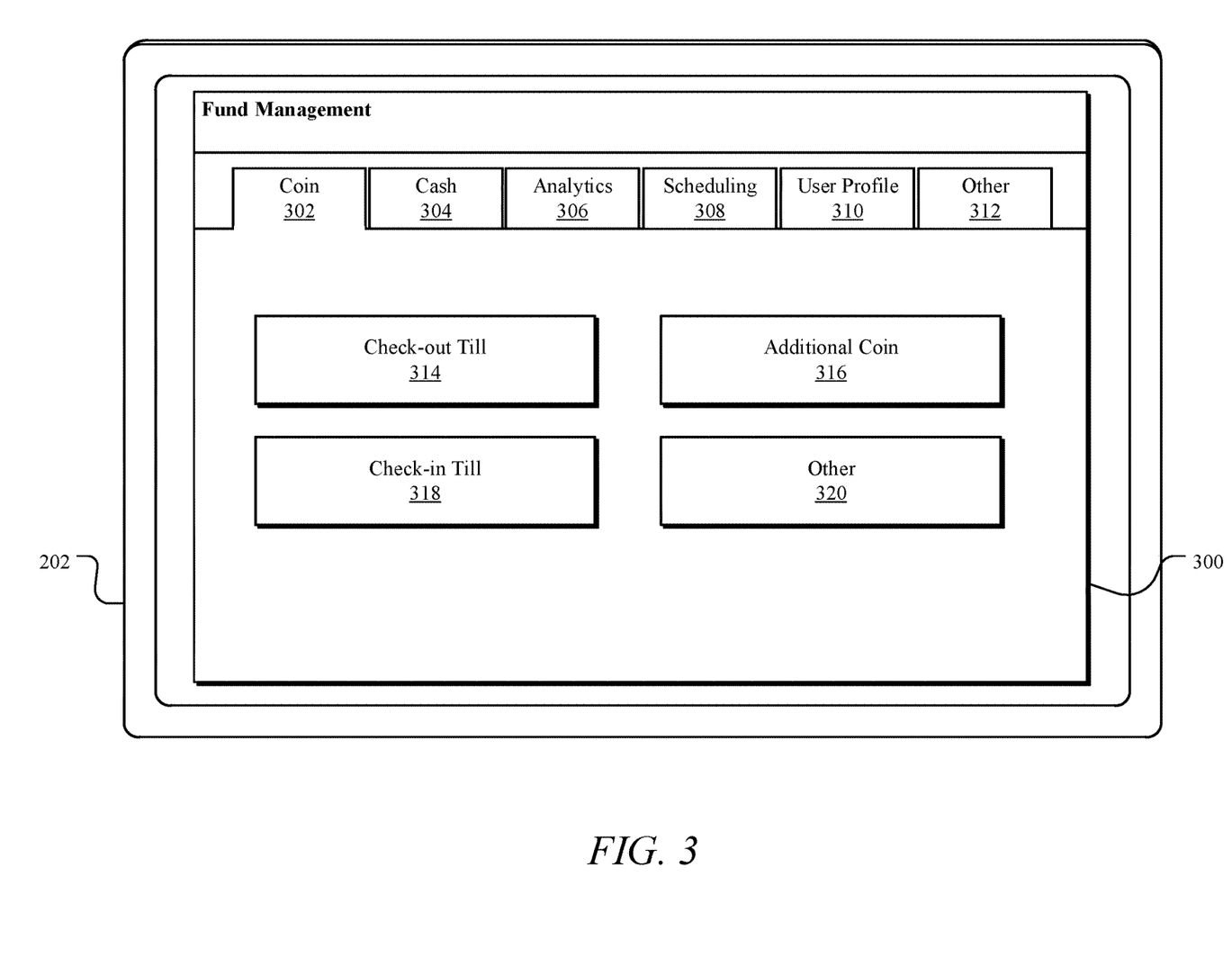
FIG. 3 shows an example user interface generated by a computing device and presented on a display of a user device through which access to and interactions with the systems and methods described herein and related data are provided.

Turning to FIG. 3, an example user interface 300 generated by a computing device, such as the recycler controller 102, and presented on a display of the user device 202 (which may be a remote tablet or integrated with the recycler controller 102, for example) through which access to and interactions with the till management systems and methods described herein and related data are provided. It will be appreciated by those skilled in the art that such depictions are exemplary only and not intended to be limiting.

In one implementation, the user interface 300 includes various options 300-312 according to permission levels for a particular user. The options may include, without limitation, coin options 302, cash options 304, analytics 306, scheduling 308, user profile options 310, and other options 312. The coin options 302 may include various options corresponding to coin management for one or more tills or the site, depending on the permission levels for the user. For example, an option 314 to check-out a till, an option 316 to obtain additional coin, and an option 318 to check-in a till may be provided to clerks and managers. Couriers and service personnel may not be provided with those options. Moreover, a manager may be provided with other options 320, such as ordering additional coin, changing standard till levels, and/or the like. The cash options 304 may provide similar options, with the difference being that the cash recycler 104 recycles the notes to provide the standard till level for note denominations and the coin scale 106 is used to measure the standard till level for coin denominations. If the user has permission, the user may be provided with various options for accessing, configuring, or controlling analytics, as well as the make adjustments to the till management for a site based on analytics. The scheduling options 308 may be used by a user with appropriate permissions to schedule a courier pickup or delivery; manage automatic ordering, pickups, or deliveries; place an order; schedule maintenance; manage automatic maintenance scheduling; and/or the like. The user profile 310 provides options for accessing or updating a user profile for one or more users based on permission levels. The other options 312 may include various other options for access to or management of various aspects of the system 100 and/or environment 200.

Figure 4:
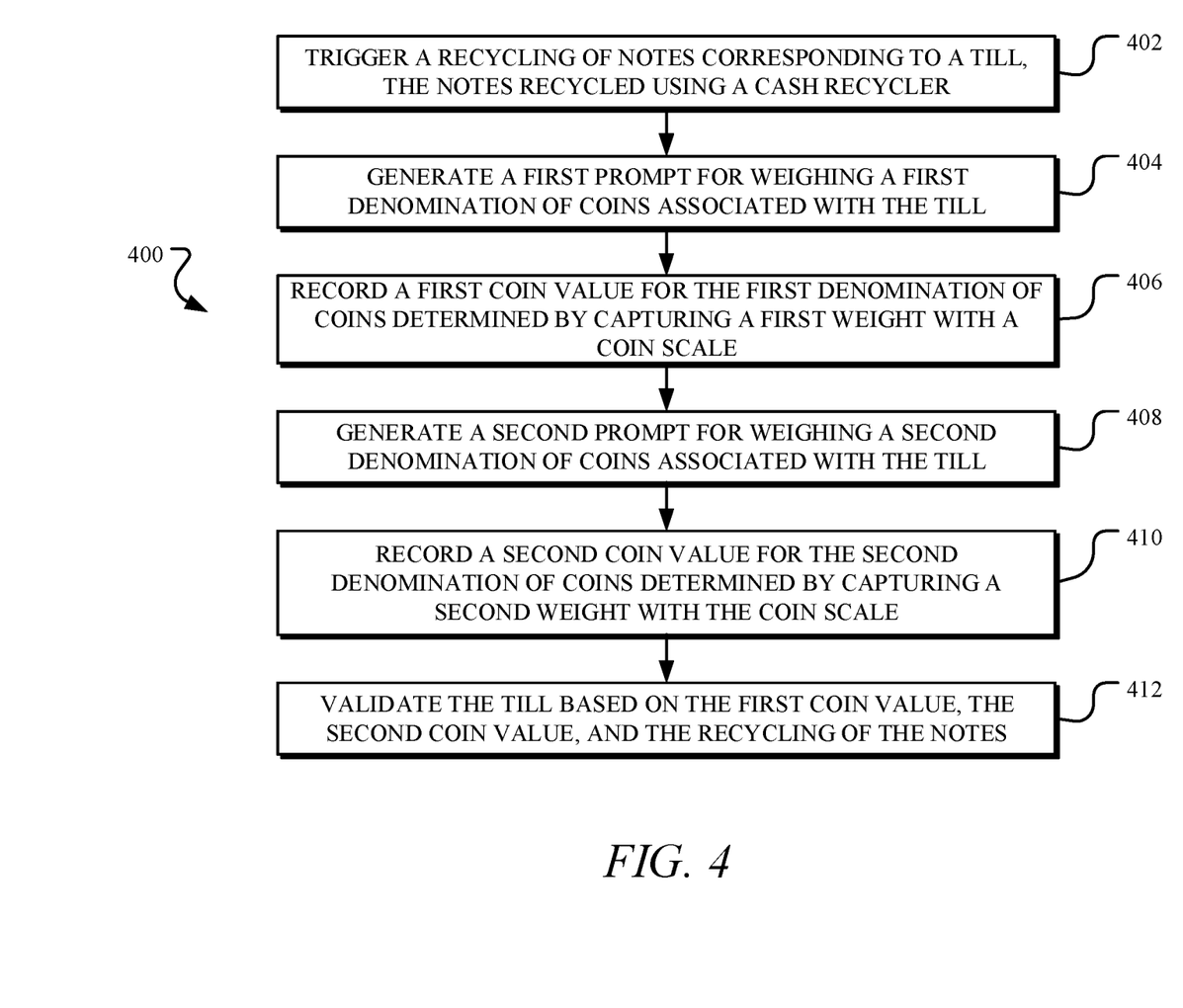
FIG. 4 illustrates example operations for till management.

Referring to FIG. 4, example operations 400 for till management are illustrated. In one implementation, an operation 402 triggers a recycling of notes, with the notes recycled using a cash recycler and the notes corresponding to a till. The till may be a cash drawer, a point-of-sale station, a virtual till, and/or the like. An operation 404 generates a first prompt for weighing a first denomination of coins of a plurality of coins associated with the till. An operation 406 records a first coin value for the first denomination of coins. The first coin value is determined by capturing a first weight of the plurality of coins corresponding to the first denomination of coins, and the first weight captured using a coin scale.

An operation 408 generates a second prompt for weighing a second denomination of coins of the plurality of coins associated with the till. An operation 410 records a second coin value for the second denomination of coins, and the second coin value is determined by capturing a second weight of the plurality of coins corresponding to the second denomination of coins. The second weight is captured using the coin scale.

An operation 412 validates the till based on the first coin value, the second coin value, and the recycling of the notes. In one implementation, the plurality of coins is returned to the till following validation. A transaction record for the till may be generated based on the first coin value, the second coin value, and the recycling of the notes. In one implementation, analytics for optimizing funds for the till are generated based on the transaction record. Analytics for optimizing funds for the till may be generated for a designated period and/or a designated location based on the first coin value, the second coin value, and the recycling of the notes. The designated period may include a designated season, a designated day of the week, a designated time of day, and/or the like and the designated location may include a geographic location, a department, a site location, and/or the like.

In some cases, it may be determined that the first coin value for the first denomination of coins is less than a standard coin value for the first denomination of coins for the till. As such, a third prompt to add an additional coin value for the first denomination of coins for weighing is generated, with the additional coin value corresponding to a difference between the first coin value and the standard coin value. An updated coin value for the first denomination of coins is recorded, the updated coin value determined by capturing an updated weight of the plurality of coins corresponding to the additional coin value and the first coin value. The updated weight is captured using the coin scale, and the till further validated based on the updated coin value.

Similarly, in some cases, a selection of an additional value of coins for the till may be received. The selection of the additional value of coins corresponds to a desired denomination of coins for which the till is low. A third prompt for weighing coins corresponding to the desired denomination of coins is generated. The additional value of coins for the desired denomination of coins is recorded, with the additional value of coins determined by capturing an associated weight of the coins corresponding to the desired denomination of coins and the associated weight captured using the coin scale. A transaction record of the additional value of coins for the desired denomination of coins being obtained for the till is generated.

In other cases, a courier pickup may be scheduled based on the first coin value, the second coin value, and the recycling of the notes. Similarly, a supply of rolled coins may be ordered based on the first coin value and the second coin value.

Figure 5:
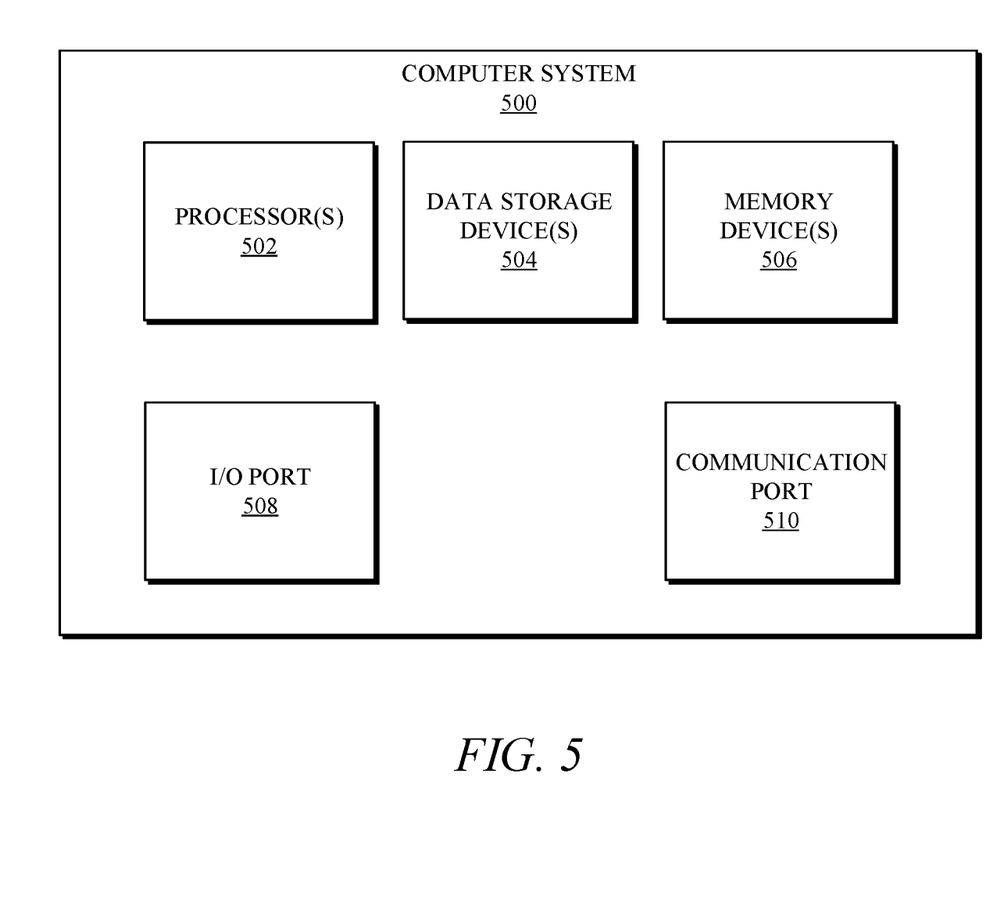
FIG. 5 is an example computing system that may implement various systems and methods discussed herein.

Referring to FIG. 5, a detailed description of an example computing system 500 having one or more computing units that may implement various systems and methods discussed herein is provided. The computing system 500 may be applicable to the recycler controller 102, the cash recycler 104, the coin scale 106, the peripheral devices 108, the user devices 202, and other computing or network devices of the system 100 and the network 200. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 508, and/or one or more ports 508-510. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a graphics processing unit (GPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device(s) 506, and/or communicated via one or more of the ports 508-510, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508 and a communication port 510, for communicating with other computing, network, or vehicle devices. It will be appreciated that the ports 508-510 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network, or over another communication means. Further, the communication port 510 may communicate with an antenna or other link for electromagnetic signal transmission and/or reception.

In an example implementation, operations for till management, and software and other modules and services may be embodied by instructions stored on the data storage devices 504 and/or the memory devices 506 and executed by the processor 502.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for till management, the method comprising:
triggering a recycling of notes using a recycler controller, the notes recycled using a cash recycler, the notes corresponding to a till;
recording a coin value of plurality of coins corresponding to the till using the recycler controller, the coin value determined by capturing a weight of a set of coins of the plurality of coins corresponding to a designated coin denomination, the weight of the set of coins captured using a coin scale;
comparing the coin value to a standard level for the till;
validating the till based on the comparing and the recycling of the notes, the till validated when the weight of the set of coins matches the standard level;
generating analytics for optimizing funds for the till for at least one of a designated period or a designated location based on a value of the notes and the coin value; and
predicting a point when additional funds will be needed for the till using the analytics.

2. The method of claim 1, wherein validating the till further includes at least one of returning the plurality of coins in connection with the recycling of the notes or securing the plurality of coins in connection with the recycling of the notes.

3. The method of claim 1, wherein till is at least one of a cash drawer, a point-of-sale station, or a virtual till.

4. The method of claim 1, wherein the plurality of coins are kept in the till after the weight is recorded.

5. The method of claim 1, wherein one or more peripheral devices are in communication with the recycler controller, the one or more peripheral devices including at least one of a storage vault, a rolled coin dispenser, or a deposit vault.

6. The method of claim 1, further comprising:
generating a transaction record for the till based on the coin value and the recycling of the notes for the till.

7. One or more non-transitory computer-readable storage media storing computer-executable instructions for performing a computer process on a computing system, the computer process comprising:
triggering a recycling of notes, the notes recycled using a cash recycler, the notes corresponding to a till;
generating a first prompt for weighing a first denomination of coins of a plurality of coins associated with the till;
recording a first coin value for the first denomination of coins, the first coin value determined by capturing a first weight of the plurality of coins corresponding to the first denomination of coins, the first weight captured using a coin scale;
generating a second prompt for weighing a second denomination of coins of the plurality of coins associated with the till;
recording a second coin value for the second denomination of coins, the second coin value determined by capturing a second weight of the plurality of coins corresponding to the second denomination of coins, the second weight captured using the coin scale;
comparing the first coin value to a first standard level for the till and the second coin value to a second standard level for the till;
validating the till based on the comparing and the recycling of the notes, the till validated when the first weight matches the first standard level for the till and the second weight matches the second standard level for the till;
generating analytics for optimizing funds for at least one of a designated period or a designated location based on the first coin value, the second coin value, and the recycling of the notes; and
predicting a point when additional funds will be needed for the till using the analytics.

8. The one or more non-transitory computer-readable storage media of claim 7, further comprising:
determining that the first coin value for the first denomination of coins is less than a standard coin value for the first denomination of coins for the till;
generating a third prompt to add an additional coin value for the first denomination of coins for weighing, the additional coin value corresponding to a difference between the first coin value and the standard coin value; and
recording an updated coin value for the first denomination of coins, the updated coin value determined by capturing an updated weight of the plurality of coins corresponding to the additional coin value and the first coin value, the updated weight captured using the coin scale, the till further validated based on the updated coin value.

9. The one or more non-transitory computer-readable storage media of claim 7, wherein the plurality of coins is returned to the till following validation.

10. The one or more non-transitory computer-readable storage media of claim 7, wherein the till is at least one of a cash drawer, a point-of-sale station, or a virtual till.

11. The one or more non-transitory computer-readable storage media of claim 7, further comprising:
generating a transaction record for the till based on the first coin value, the second coin value, and the recycling of the notes.

12. The one or more non-transitory computer-readable storage media of claim 7, further comprising:
receiving a selection of an additional value of coins for the till, the selection of the additional value of coins corresponding to a desired denomination of coins for which the till is low;
generating a third prompt for weighing coins corresponding to the desired denomination of coins;
recording the additional value of coins for the desired denomination of coins, the additional value of coins determined by capturing an associated weight of the coins corresponding to the desired denomination of coins, the associated weight captured using the coin scale; and
generating a transaction record of the additional value of coins for the desired denomination of coins being obtained for the till.

13. The one or more non-transitory computer-readable storage media of claim 7, wherein the analytics for optimizing funds for the till are generated based on a transaction record.

14. The one or more non-transitory computer-readable storage media of claim 7, wherein the designated period includes at least one of a designated season, a designated day of the week, or a designated time of day and the designated location includes at least one of a geographic location, a department, or a site location.

15. The one or more non-transitory computer-readable storage media of claim 7, wherein a courier pickup is scheduled based on the first coin value, the second coin value, and the recycling of the notes.

16. The one or more non-transitory computer-readable storage media of claim 7, wherein a supply of rolled coins is ordered based on the first coin value and the second coin value.

17. A system for till management, the system comprising:
a cash recycler, the cash recycler configured to recycle notes associated with a till;
a coin scale, the coin scale configured to capture a weight of a set of coins corresponding to a coin denomination for the till, a coin value for the set of coins being determined based on the weight of the set of coins;
a recycler controller in communication with the cash recycler and the coin scale, the recycler controller configured to validate the till based on a comparison of the coin value to a standard level of the till and the notes, the till validated when the weight matches the standard level; and
a fund optimization controller in communication with the recycler controller, the fund optimization controller configured to generate analytics for optimizing funds for at least one of a designated period or a designated location based on the coin value and a value of the notes to predict a point when additional funds will be needed for the till.

18. The system of claim 17, further comprising:
one or more peripheral devices in communication with the recycler controller, the one or more peripheral devices including at least one of a storage vault, a rolled coin dispenser, or a deposit vault.

* * * * *